United States Patent

Murakami et al.

Patent Number: 6,042,144
Date of Patent: Mar. 28, 2000

[54] PASSENGER SIDE AIR BAG

[75] Inventors: Takashi Murakami; Keiichi Yamada; Yorihito Okuda, all of Omiya, Japan

[73] Assignees: Kansei Corporation, Omiya; Nissan Motor Co., Ltd., Yokohama, both of Japan

[21] Appl. No.: 08/978,473

[22] Filed: Nov. 25, 1997

[30] Foreign Application Priority Data

Nov. 26, 1996 [JP] Japan ................................. 8-314759

[51] Int. Cl.[7] .................................................. B60R 21/22
[52] U.S. Cl. ........................................ 280/732; 280/743.1
[58] Field of Search ................................ 280/732, 743.1, 280/728.1, 729, 730.1, 743.2

[56] References Cited

U.S. PATENT DOCUMENTS

| | | | |
|---|---|---|---|
| 4,186,941 | 2/1980 | Scholz et al. | 280/743.1 |
| 5,048,863 | 9/1991 | Henseler et al. | 280/743.1 |
| 5,160,164 | 11/1992 | Fischer et al. | 280/732 |
| 5,378,019 | 1/1995 | Smith et al. | 280/743.1 |
| 5,395,134 | 3/1995 | Gunn et al. | 280/743.1 |
| 5,421,610 | 6/1995 | Kavanaugh et al. | 280/743.1 |

FOREIGN PATENT DOCUMENTS

| | | | |
|---|---|---|---|
| 593172 | 4/1994 | European Pat. Off. | 280/729 |
| 6-255437 | 9/1994 | Japan | 280/732 |

*Primary Examiner*—Peter C. English
*Attorney, Agent, or Firm*—Jacobson, Price, Holman & Stern PLLC

[57] ABSTRACT

In order to simplify the complex setting of the expansion pressure of an inflator and easily control the expanded direction of an air bag, the air bag is contained in an instrument panel such that the air bag faces an expansion opening formed in an upper surface of the instrument panel and, when a pressure fluid discharged from the inflator is fed into the air bag through an inlet of the air bag and thereby the air bag is inflated and expanded, a front bag part for a front side of a vehicle and a rear bag part for a rear side of the vehicle are inflated and expanded forward and rearward in a vehicle longitudinal direction with the inlet therebetween, respectively. The air bag has a seam, formed in the front bag part, for temporarily delaying delivery of the pressure fluid into the front bag part during initial inflation of the air bag. Thereby, the front bag part is inflated and expanded later than the rear bag part.

8 Claims, 4 Drawing Sheets

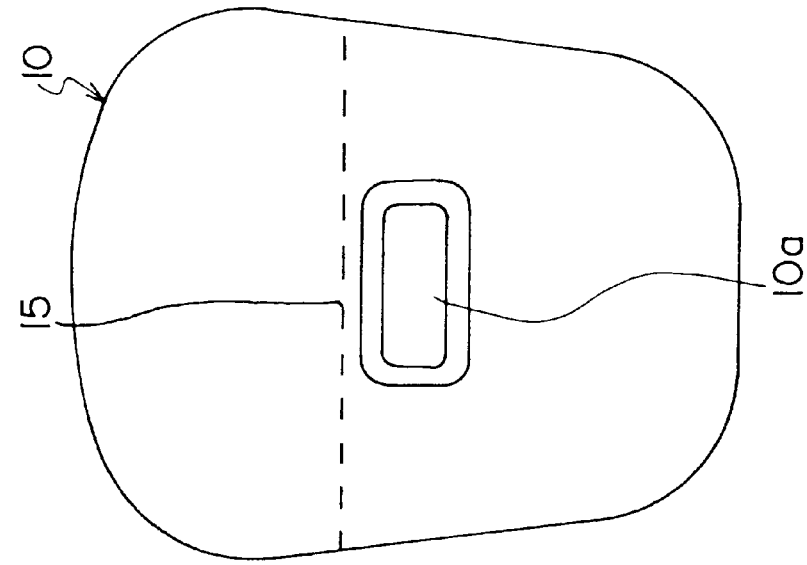
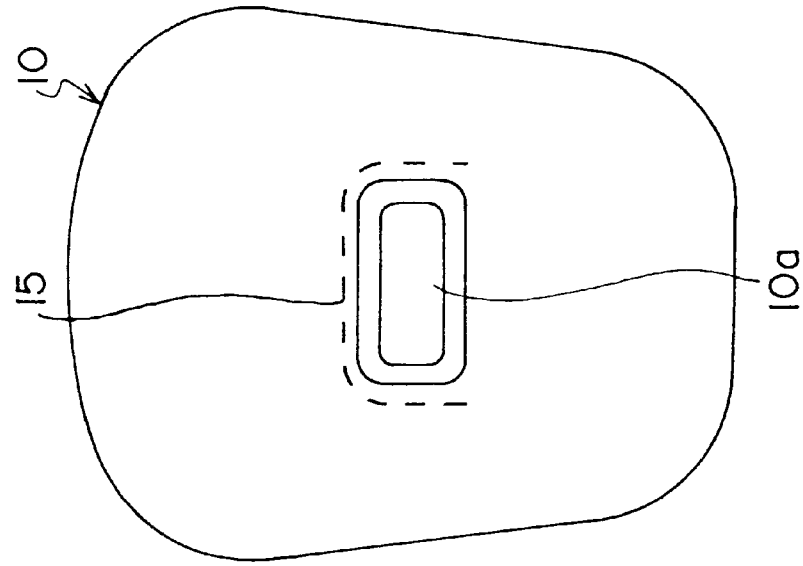
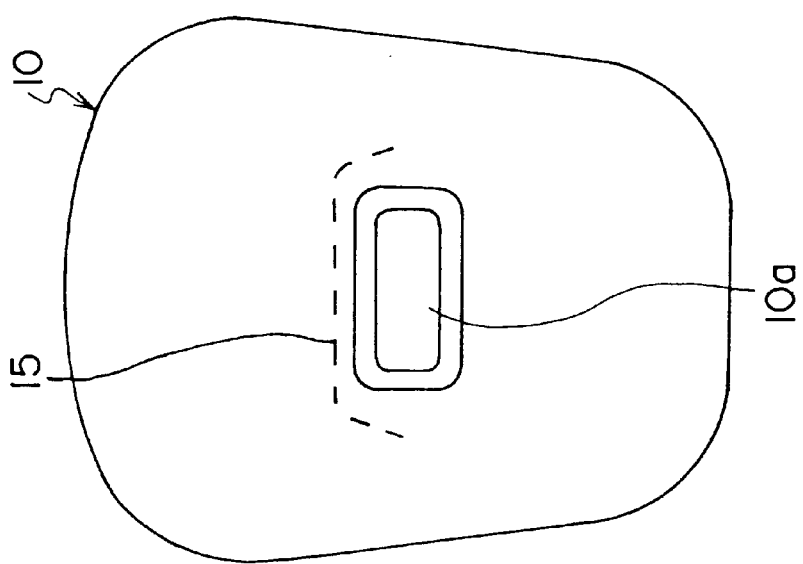

PASSENGER SIDE AIR BAG

BACKGROUND OF THE INVENTION

1. Field of the Invention

This invention relates to an air bag in which cloths of a predetermined shape are laid on each other and are formed into a bag by joining their peripheries, and thereafter an inlet through which gas discharged interrelatedly with the actuation of an inflator enters the bag is formed in one of the cloths, and the bag is inflated with the gas which has entered through the inlet and is expanded diagonally to the rear of a vehicle from an opening formed in an upper part of an instrument panel.

2. Description of the Related Art

There is known an air bag device mounted in a vehicular instrument panel on the side of an assistant driver's seat (i.e., the seat next to the driver).

An example is also known in which an expansion opening through which an air bag is expanded is formed in an upper part of an instrument panel for structural reasons, such as the shape of the instrument panel, dispositional space requirements, or the like.

In the air bag device, a lid with which the expansion opening is closed is formed integrally with the instrument panel or is formed discretely therefrom. An inflator is mounted to face the back side of the lid in the instrument panel.

The inflator is provided with an air bag formed in such a way that cloths of a predetermined shape are laid on each other and their peripheries are joined. An inlet through which a pressure fluid enters is formed substantially in the center of one of the cloths.

The air bag begins to be inflated with the pressure fluid, such as gas, discharged interrelatedly with the actuation of the inflator.

The lid is cracked and opened by the expansion pressure of the air bag, and thereby the expansion opening is opened. The air bag continues to be inflated and expanded through the expansion opening obliquely toward the rear of the vehicle. Thus, the air bag cushions and protects the head, or the like, of the passenger at the assistant driver's seat so as not to be thrown forward directly into the instrument panel.

From the fact that the air bag is used to protect the head, etc. of the passenger in the event of collision, the time required until the air bag is satisfactorily inflated must be set to be extremely short.

A solution to this problem might be that the inflator is designed to discharge the fluid at higher pressure.

However, if the discharge pressure of the fluid becomes higher, the setting of the inflator will become very difficult because of the relationship with a sitting manner of the passenger.

In addition, if the expansion opening is directed upward, a front windshield is above the expansion opening.

Therefore, it is preferable to control the expanded direction of the air bag not to strike against the front windshield or not to strike against it at high pressure.

SUMMARY OF THE INVENTION

It is therefore an object of the present invention to provide an air bag which is capable of simplifying the complex setting of the expansion pressure of an inflator and is capable of easily controlling the expanded direction of the air bag.

The air bag according to the present invention is characterized in that the air bag is contained in an instrument panel such that the air bag faces an expansion opening formed in an upper surface of the instrument panel and, when a pressure fluid discharged from an inflator is fed into the air bag through an inlet of the air bag and thereby the air bag is inflated and expanded, a front bag part for a front side of a vehicle and a rear bag part for a rear side of the vehicle are inflated and expanded forward and rearward in a vehicle longitudinal direction with the inlet therebetween, respectively, and the air bag has a delay means, formed in the front bag part, for temporarily delaying delivery of the pressure fluid into the front bag part of the air bag during initial inflation of the air bag, whereby the front bag part is inflated later than the rear bag part of the air bag.

BRIEF DESCRIPTION OF THE DRAWINGS

FIGS. 1(A) to 1(C) are rear views of air bags according to the present invention, each showing a pattern of a delay means.

DESCRIPTION OF THE PREFERRED EMBODIMENT

An embodiment of the present invention will be described with reference to the attached drawings.

Figure 4:
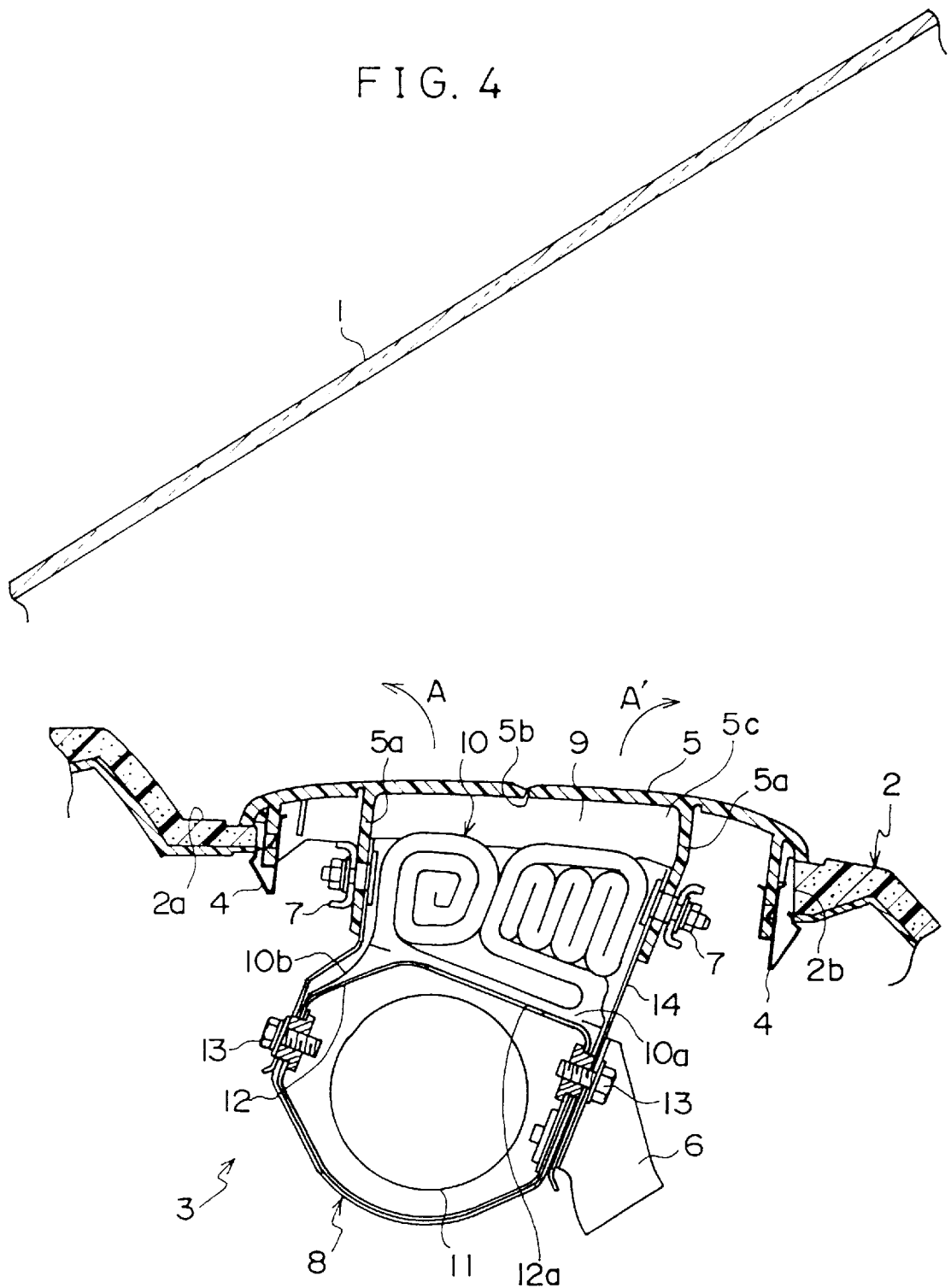
FIG. 4 is a longitudinal sectional view of an air bag device containing the air bag.

In FIG. 4, reference numeral 1 designates a front windshield glass, reference numeral 2 designates an instrument panel of a vehicle, and reference numeral 3 designates a high-mount type of air bag device. An opening 2b is formed in the upper plane 2a of the instrument panel 2.

The air bag device 3 comprises a resinous lid 5 fixed on the opening 2b by means of clips 4, a module housing 8 fixed to a part (for example, a steering support member, not shown) of the vehicle by means of a bracket 6, and an air bag 10 in a folded state which is contained in a space 9 defined by the module housing 8 and the lid 5. The module housing 8 is connected also to legs 5a of the lid 5 by means of connecting members 7.

The lid 5 has a frontally H-shaped groove 5b (the whole of this is not depicted) along which the lid 5 is cracked and opened. The groove 5b is broken by the pressure generated when the air bag 10 is inflated. When broken, the lid 5 is opened in the directions of arrows A and A' receding from each other while allowing the groove 5b shown in FIG. 4 to be used as a free end.

The module housing 8 comprises a cylindrical diffuser 12 containing a cylindrical inflator 11 from which a pressure fluid (gas, for example) is discharged, and an upper housing 14 connected to the diffuser 12 by means of connecting members 13. The diffuser 12 has an opening 12a. The diffuser 12 controls the quantity or direction of the pressure fluid discharged from the inflator 11, depending on the shape of the diffuser 12 or depending on the formed position or area of the opening 12a. The upper housing 14 defines a space 9 for containing the air bag 10 above the diffuser 12. The upper housing 14 is connected also to the lid 5 by means of the connecting members 7.

The air bag 10 is formed into a bag in such a way that cloths are laid on each other and their peripheries are joined. In one of the cloths, an inlet 10a is formed for allowing the pressure fluid discharged through the opening 12a to flow into the bag. In addition, as shown in FIGS. 1(A) to 1(C), the air bag 10 has a delay means 15 which is a seam extending along a part of the periphery of the inlet 10a. The air bag 10 further has a fixing flap 10b. The diffuser 12 is partially covered with the fixing flap 10b in a state where the inlet 10a of the air bag 10 faces the opening 12a of the diffuser 12. In this state, the fixing flap 10b is attached to the upper housing 14 and the diffuser 12 by means of the connecting members 13.

Figure 2A:
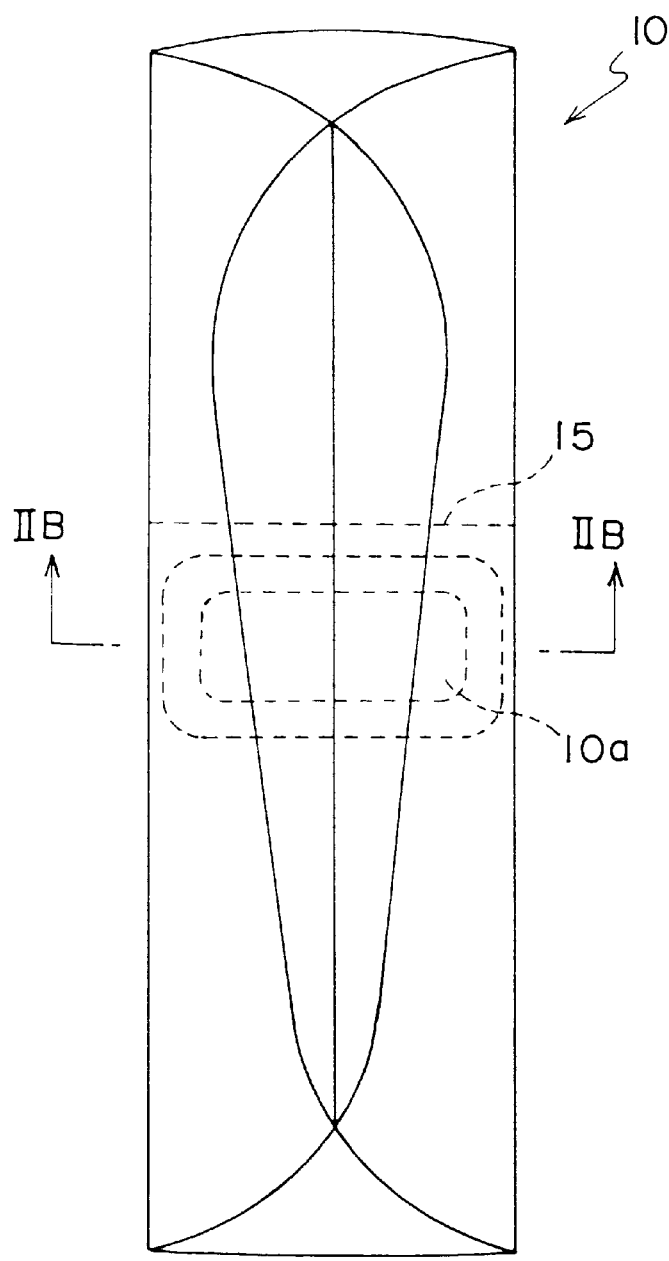
FIG. 2(A) is a front view of the air bag in a folded state.
Figure 2B:
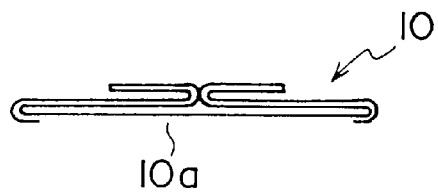
FIG. 2(B) is a sectional view of the air bag, taken on line IIB—IIB in FIG. 2(A).

As shown in FIGS. 2(A), 2(B), and 4, the air bag 10 is contained in the space 9 in such a way that, regarding the air bag which has been fully inflated as a standard of comparison, right and left bag parts with the inlet 10a therebetween in a vehicle lateral direction are folded a plurality of times toward the inlet 10a, upper and lower bag parts with the inlet 10a therebetween in a vehicle longitudinal direction are then gathered toward the inlet 10a, and a bag part above the inlet 10a in a vehicle vertical direction is placed on the front side of the vehicle.

As best shown in FIG. 4, the bag part to the front of the inlet 10a in the vehicle longitudinal direction (which is situated higher than the inlet 10a when the air bag is inflated) is rolled like a scroll, and the air bag to the rear of the inlet 10a in the vehicle longitudinal direction (which is situated lower than the inlet 10a when the air bag is inflated) is folded like the bellows of an accordion. The scroll-like bag part is rolled so that it is unrolled upward in the vehicle during the inflation, whereas the accordion-like bag part is folded alternately with a predetermined width from the front end (which is the lowest part when the air bag is inflated) to the middle of the bag part. The accordion-folds are surrounded with the remaining bag part close to the inlet 10a.

In the air bag 10 which begins to be inflated interrelatedly with the actuation of the inflator 11, the delay means 15 is formed to the fronts of the inlet 10a in the vehicle longitudinal direction (i.e., formed on the left side in FIG. 4) and near the inlet 10a. The extending direction and length of the delay means 15 are determined to shut off the flow of the pressure fluid into the bag part to the front of the inlet 10a. Therefore, various types of delay means can be used, as shown in, for example, FIGS. 1(A) to 1(C), without being limited to specific ones. Nylon™ or the like is used as thread material for the delay means 15. Since the delay means 15 is merely required to be broken under predetermined pressure or more, various sorts of materials can be used by adjustment to their thicknesses.

If the delay means 15 is designed to be a turned "U" shape extending along a part of the periphery of the substantially rectangular inlet 10a, the effect of delaying the initial inflation of the air bag 10 will be achieved without lengthening the delay means 15.

In this embodiment, the effect of delaying the initial inflation signifies that, in the air bag contained as shown in FIG. 4, the bag part (i.e., scroll-like bag part) to the front of the inlet 10a in the vehicle longitudinal direction is inflated later than the bag part (i.e., accordion-like bag part) to the rear of the inlet 10a when the air bag 10 begins to be inflated interrelatedly with the actuation of the inflator 11.

The thus operating air bag 10 is formed in such a way that, as mentioned above, cloths of a predetermined shape one of which has the inlet 10a are laid on each other and their peripheries are joined, and thereafter are turned outside in to be a bag whose seam allowance does not show, and thereafter are provided with the fixing flap 10b and the delay means 15.

After that, as shown in FIGS. 2(A) and 2(B), the air bag is folded to have fold lines of the bag part, opposite to the bag part provided with the inlet 10a, which extend in the direction of the short sides of the substantially rectangular inlet 10a. The bag part to the rear of the inlet 10a in the vehicle longitudinal direction (on the right side in FIG. 4) is then folded like the bellows of an accordion, whereas the bag part to the front of the inlet 10a in the vehicle longitudinal direction (on the left side in FIG. 4) is rolled like a scroll.

In this state, the diffuser 12 in which the inflator 11 has been set is inserted into the fixing flap 10b, and these are united with the upper housing 14 by means of the connecting members 13.

Beforehand (or, alternatively, after reaching the aforementioned state), the lid 5 is attached to the upper housing 14 by means of the connecting members 7, and is attached to the instrument panel 2 by means of the clips 4.

When the inflator 11 is actuated, a pressure fluid is discharged from the inflator 11. The pressure fluid flows to the inlet 10a through the opening 12a of the diffuser 12 while the quantity and flow direction of the pressure fluid are being controlled by the diffuser 12. The pressure fluid then flows into the air bag 10 through the inlet 10a.

The air bag 10 is inflated in accordance with the introduction of the pressure fluid thereinto. When the air bag 10 starts inflation, a part of the lid 5 is first cracked and opened (in this embodiment, along the H-shaped groove), and, as a result, the expansion opening 5c appears. At the same time, the air bag 10 is progressively expanded from the expansion opening 5c.

Figure 3:
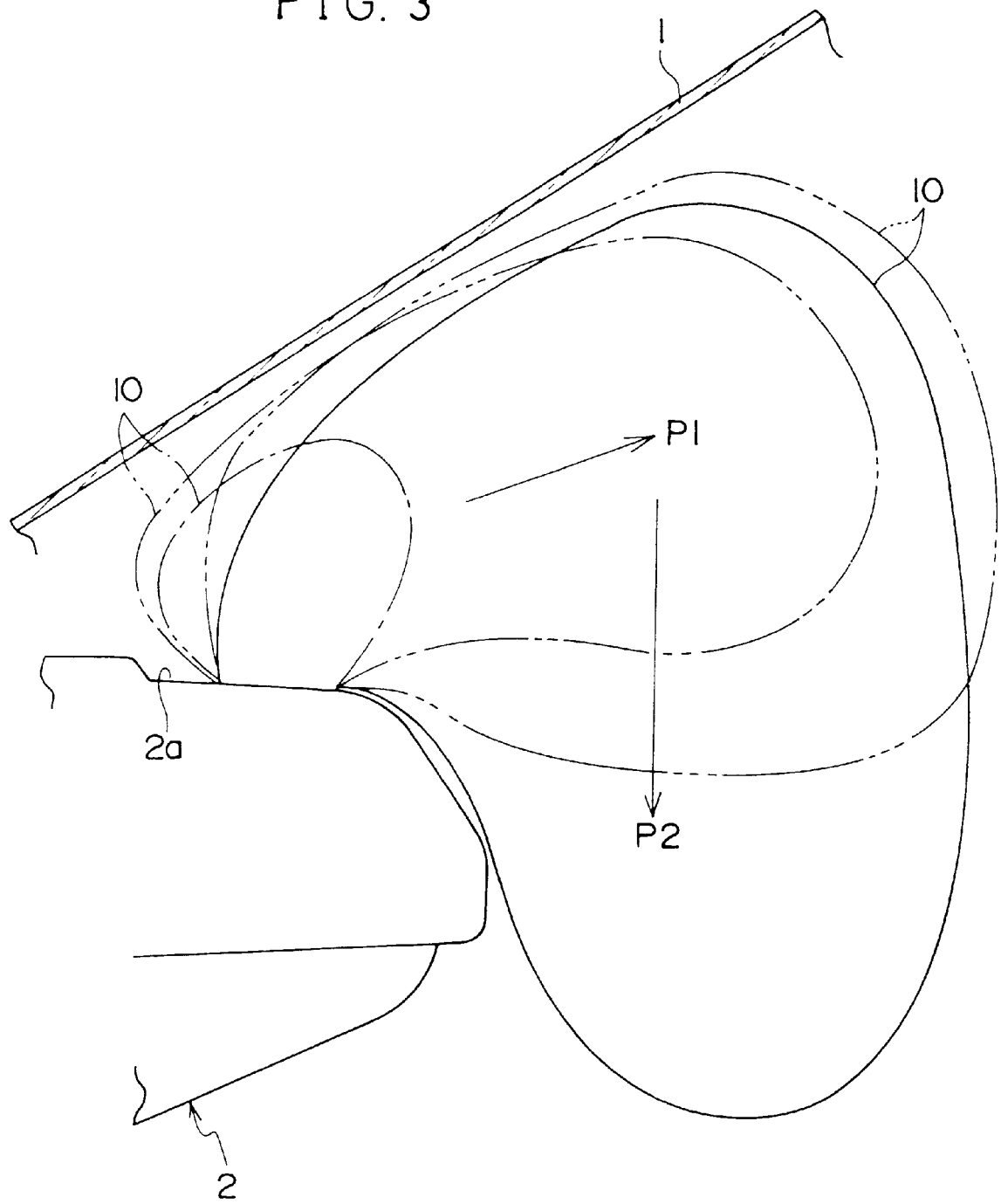
FIG. 3 is a descriptive drawing of the air bag inflated and expanded, which is shown with the lapse of time.

FIG. 3 shows the initial state of the inflation and expansion of the air bag 10 according to the present invention, with the lapse of time.

As described above, the air bag 10 is provided with the delay means 15. In addition, the air bag 10 is contained such that the bag part to the front of the inlet 10a in the vehicle longitudinal direction is rolled like a scroll. Therefore, generally, the pressure fluid from the inflator can flow into the air bag 10 so that the air bag 10 is more easily inflated and expanded toward the rear of the vehicle.

As shown by the alternate long and short dash line of FIG. 3, immediately after the air bag 10 is inflated and expanded from the upper plane 2a of the instrument panel 2, the air bag 10 is expanded from above the upper plane 2a slightly toward the rear of the vehicle. Thereafter, as shown by the alternate long and two short dashes line and the alternate long and three short dashes line of FIG. 3, the air bag 10 is greatly inflated and expanded diagonally toward the rear of the vehicle (i.e., in the direction of arrow P1) along the inclined surface of the front windshield glass 1.

When the inflation of the accordion-like bag part to the rear of the inlet 10a is completed, the delay means 15 is broken by the pressure of the fluid continuously discharged from the inflator 11. Thereby, the scroll-like bag part to the front of the inlet 10a begins to be fully inflated.

In fact, the scroll-like bag part to the front of the inlet 10a of the air bag 10 is expanded diagonally toward the rear of the vehicle (note that the flow direction of the pressure fluid is controlled by the diffuser 12 so as to be discharged diagonally toward the rear of the vehicle). For this reason, as shown by the solid line of FIG. 3, the front end of the accordion-like bag part to the rear of the inlet 10a which has been earlier inflated and expanded is directed and continuously expanded downward in the vehicle (i.e., in the direction of arrow P2).

Thus, the feeding of the pressure fluid discharged from the inflator 11 into the air bag 10 is controlled by the delay means 15 step by step. In other words, the accordion-like bag part to the rear of the inlet 10a is first inflated and expanded, and then the scroll-like bag part to the front of the inlet 10a of the air bag 10 is inflated and expanded.

Broadly speaking, the air bag 10 is expanded from the upper plane 2a of the instrument panel 2 diagonally toward the rear of the vehicle, and, strictly speaking, the air bag 10 is expanded as if the front end of the air bag 10 rotates.

Therefore, the air bag 10 is capable of reducing the expansion pressure against the passenger without constantly adjusting the pressure of the fluid discharged from the inflator 11, and is capable of broadening the area for cushioning the passenger.

Since the air bag 10 is contained in the instrument panel 2 in such a way that, as mentioned above, the bag part to the rear of the inlet 10a in the vehicle longitudinal direction is folded like the bellows of an accordion whereas the bag part to the front of the inlet 10a in the vehicle longitudinal direction is rolled like a scroll, the aforementioned advantages can be more tightly secured by adding the effect of the delay means 15.

Besides, the air bag 10 does not strike so hard against the front windshield glass 1 in spite of the fact that the expansion opening 5c formed in the instrument panel 2 is directed upward.

As described above, since the air bag according to the present invention has the delay means which is, during the initial inflation of the air bag, disposed near and to the front of the inlet through which the pressure fluid is fed, in order to temporarily delay the inflow of the pressure fluid used for inflating the scroll-like bag part to the front of the inlet, it is possible to simplify the elaborate adjustment to the pressure of the fluid discharged from the inflator and, additionally, facilitate the control of the direction in which the air bag is inflated and expanded.

What is claimed is:

1. An air bag for a passenger seat, said air bag being housed in an instrument panel such that said air bag faces an expansion opening formed in an upper surface of the instrument panel and, when a pressure fluid discharged from an inflator is fed into said air bag through an inlet of said air bag and thereby said air bag is inflated and expanded, a bag part for a front side of a vehicle and a bag part for a rear side of the vehicle are inflated and expanded forward and rearward in a longitudinal direction of the vehicle with said inlet therebetween, respectively, said air bag having delay means formed in said bag part for the front side of the vehicle, for temporarily delaying feeding the pressure fluid into said bag part for the front side of the vehicle during initial inflation of said air bag, whereby said bag part for the front side of the vehicle is inflated later than said bag part for the rear side of the vehicle, wherein said delay means is a seam by which a pair of cloths forming said bag part for the front side of the vehicle are joined, said seam being broken under predetermined pressure.

2. The air bag for a passenger seat of claim 1, wherein said delay means is situated near said inlet in said part for the front side of the vehicle, and at least a part of said delay means extends along a periphery of said inlet.

3. The air bag for a passenger seat of claim 2, wherein said inlet is shaped rectangular, and said delay means extends substantially in the shape of the letter U along a first side of said inlet facing said bag part for the front side of the vehicle and two sides of said inlet perpendicular to said first side.

4. The air bag for a passenger seat of claim 2, wherein said delay means extends in a lateral direction of the vehicle, covering a whole width of said bag part for the front side of the vehicle.

5. An air bag for a passenger seat, said air bag being housed in an instrument panel such that said air bag faces an expansion opening formed in an upper surface of the instrument panel and, when a pressure fluid discharged from an inflator is fed into said air bag through an inlet of said air bag and thereby said air bag is inflated and expanded, a bag part for a front side of a vehicle and a bag part for a rear side of the vehicle are inflated and expanded forward and rearward in a longitudinal direction of the vehicle with said inlet therebetween, respectively, said air bag having delay means formed in said bag part for the front side of the vehicle, for temporarily delaying feeding the pressure fluid into said bag part for the front side of the vehicle during initial inflation of said air bag, whereby said bag part for the front side of the vehicle is inflated later than said bag part for the rear side of the vehicle, said air bag being housed in the instrument panel in a state in which said bag part for the front side of the vehicle is rolled like a scroll whereas said bag part for the rear side of the vehicle is folded like bellows of an accordian.

6. The air bag for a passenger seat of claim 5, wherein said delay means is situated near said inlet in said bag part for the front side of the vehicle, and at least a part of said delay means extends along a periphery of said inlet.

7. The air bag for a passenger seat of claim 6, wherein said inlet is shaped rectangularly, and said delay means extends substantially in the shape of the letter U along a first side of said inlet facing said bag part for the front side of the vehicle and two sides of said inlet perpendicular to said first side.

8. The air bag for a passenger seat of claim 6, wherein said delay means extends in a lateral direction of the vehicle, covering a whole width of said bag part for the front side of the vehicle.

* * * * *